(12) United States Patent
Macintosh et al.

(10) Patent No.: US 11,966,098 B2
(45) Date of Patent: *Apr. 23, 2024

(54) MODULAR LENS SYSTEM FOR MOTION PICTURE CAMERA APPLICATIONS

(71) Applicant: Panavision International, L.P., Woodland Hills, CA (US)

(72) Inventors: David William Macintosh, Calabasas, CA (US); Daniel Keith Sasaki, Glendale, CA (US)

(73) Assignee: Panavision International, L.P., Woodland Hills, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/709,745

(22) Filed: Dec. 10, 2019

(65) Prior Publication Data

US 2020/0292782 A1 Sep. 17, 2020

Related U.S. Application Data

(63) Continuation of application No. 16/105,808, filed on Aug. 20, 2018, now Pat. No. 10,502,927, which is a
(Continued)

(51) Int. Cl.
*G02B 13/08* (2006.01)
*G02B 7/02* (2021.01)
(Continued)

(52) U.S. Cl.
CPC ............... *G02B 7/14* (2013.01); *G02B 7/02* (2013.01); *G02B 7/102* (2013.01); *G02B 13/08* (2013.01);
(Continued)

(58) Field of Classification Search
CPC ........ G02B 13/08; G02B 3/00; G02B 25/001; G02B 15/173; G02B 7/102; G02B 7/10;
(Continued)

(56) References Cited

U.S. PATENT DOCUMENTS 3,968,504 A 7/1976 Komine
5,455,650 A 10/1995 Fujiwara
(Continued)

FOREIGN PATENT DOCUMENTS

JP h0518827 A 7/1993
JP 2004295004 A 10/2004

OTHER PUBLICATIONS

International Search Report dated Apr. 1, 2016 for corresponding International Application No. PCT/US2015/065343 filed Dec. 11, 2015; total 4 pages.
(Continued)

*Primary Examiner* — Dawayne Pinkney
(74) *Attorney, Agent, or Firm* — Snell & Wilmer L.L.P.

(57) ABSTRACT

A modular lens system for use with a camera system and connected therewith. The lens system including modular sections configured to include one or more lenses and/or an aperture. The one or more lenses are controlled by one or more motors to enhance focus, softness, and/or size and other optical characteristics.

17 Claims, 7 Drawing Sheets

Related U.S. Application Data continuation of application No. 14/967,039, filed on Dec. 11, 2015, now Pat. No. 10,054,761.

(60) Provisional application No. 62/090,622, filed on Dec. 11, 2014.

(51) Int. Cl.
*G02B 7/10* (2021.01)
*G02B 7/14* (2021.01)
*G02B 15/02* (2006.01)
*G02B 15/14* (2006.01)
*G03B 3/10* (2021.01)
*G03B 5/00* (2021.01)
*G03B 17/14* (2021.01)
*G03B 17/56* (2021.01)

(52) U.S. Cl.
CPC ............... *G02B 15/02* (2013.01); *G03B 3/10* (2013.01); *G03B 5/00* (2013.01); *G03B 17/14* (2013.01); *G03B 17/56* (2013.01); *G03B 17/565* (2013.01)

(58) Field of Classification Search
CPC .. G02B 25/002; G11B 7/0932; G11B 7/0935; G03B 17/14
USPC ........ 359/668, 670, 642–643, 676, 695–696, 359/808–830
See application file for complete search history.

(56) References Cited

U.S. PATENT DOCUMENTS

| | | |
|---|---|---|
| 6,922,525 B2 | 7/2005 | Lee |
| 2005/0031327 A1 | 2/2005 | Lee |
| 2005/0237417 A1 | 10/2005 | Miyasaka |
| 2009/0268078 A1 | 10/2009 | Miyazaki et al. |
| 2010/0046101 A1 | 2/2010 | Nakamura |
| 2010/0091175 A1 | 4/2010 | Shintani et al. |
| 2010/0208122 A1* | 8/2010 | Yumiki .............. H04N 5/23209 348/333.08 |
| 2012/0114319 A1 | 5/2012 | Kishida |
| 2013/0021687 A1 | 1/2013 | Santo et al. |
| 2013/0077954 A1 | 3/2013 | Oikawa et al. |
| 2013/0094101 A1* | 4/2013 | Oguchi ................ G03B 17/565 359/745 |

OTHER PUBLICATIONS

Written Opinion of the International Searching Authority dated Apr. 1, 2016 for corresponding International Application No. PCT/US2015/065343 filed Dec. 11, 2015; total 7 pages.

International Preliminary Report on Patentability dated Jun. 13, 2017 for corresponding International Application No. PCT/US2015/065343 filed Dec. 11, 2015; total 8 pages.

Non-Final Office Action dated Nov. 10, 2016 for corresponding U.S. Appl. No. 14/967,039, filed Dec. 11, 2015; total 9 pages.

Final Office Action dated May 2, 2017 for corresponding U.S. Appl. No. 14/967,039, filed Dec. 11, 2015; total 11 pages.

Non-Final Office Action dated Sep. 28, 2017 for corresponding U.S. Appl. No. 14/967,039, filed Dec. 11, 2015; total 15 pages.

Notice of Allowance dated Apr. 20, 2018 for corresponding U.S. Appl. No. 14/967,039, filed Dec. 11, 2015; total 8 pages.

Non-Final Office Action dated Apr. 16, 2019 for corresponding U.S. Appl. No. 16/105,808, filed Aug. 20, 2018; total 10 pages.

Notice of Allowance dated Aug. 12, 2019 for corresponding U.S. Appl. No. 16/105,808, filed Aug. 20, 2018; total 12 pages.

* cited by examiner

MODULAR LENS SYSTEM FOR MOTION PICTURE CAMERA APPLICATIONS

CROSS-REFERENCE TO RELATED APPLICATIONS

This patent application is a continuation of U.S. patent application Ser. No. 16/105,808 filed Aug. 20, 2018, now U.S. Pat. No. 10,502,927, which is a continuation of U.S. patent application Ser. No. 14/967,039 filed Dec. 11, 2015, now U.S. Pat. No. 10,054,761, which claims the benefit of U.S. Provisional Patent Application No. 62/090,622 filed Dec. 11, 2014, which applications are hereby incorporated by reference in their entirety.

FIELD

The present disclosure relates to systems, apparatuses, and methods for modular lens systems.

BACKGROUND

Traditional lens systems include mechanical controls that operate a series of gears, helicals, cams or the like to vary focus, zoom, or other optical properties of the lens system. It may be difficult to interchange components of the lens system due to the mechanical transport existing between various components of the system.

In addition, prior mechanical systems may lack the ability to correctly adjust image softness and other optical properties, due to the variety and complexity of components existing in the lens system.

SUMMARY

The systems, apparatuses, and methods disclosed herein are intended to provide for improved interchangeability of lens system components, and improved electronic control of optical features such as focus, image softness, and aperture size. The systems, apparatuses, and methods disclosed herein may serve to improve the utility of lens inventory for a user or supplier, thereby reducing costs.

In one embodiment, a modular lens system comprises a front section including one or more lenses, a central section configured to be removably coupled to the front section and including one or more lenses and an aperture, and one or more motors configured to move the one or more lenses of the central section to effect a change in a focus, magnification, or a softness of an image produced by the central section based on a user input, or to move the aperture to effect a change in a size of the aperture based on a user input.

In one embodiment, a modular lens system comprises a lens module including one or more lenses and an aperture, and configured to be removably coupled to a camera including an imaging area, and one or more motors configured to move the one or more lenses of the lens module to effect a change in a focus, magnification, or a softness or a position of an image produced by the lens module based on a user input, or to alter the size of the aperture to effect a change in an intensity of the image based on a user input.

BRIEF DESCRIPTION OF THE DRAWINGS

Features and advantages of the systems, apparatuses, and methods as disclosed herein will become appreciated as the same become better understood with reference to the specification, claims, and appended drawings wherein:

DETAILED DESCRIPTION

Figure 1:
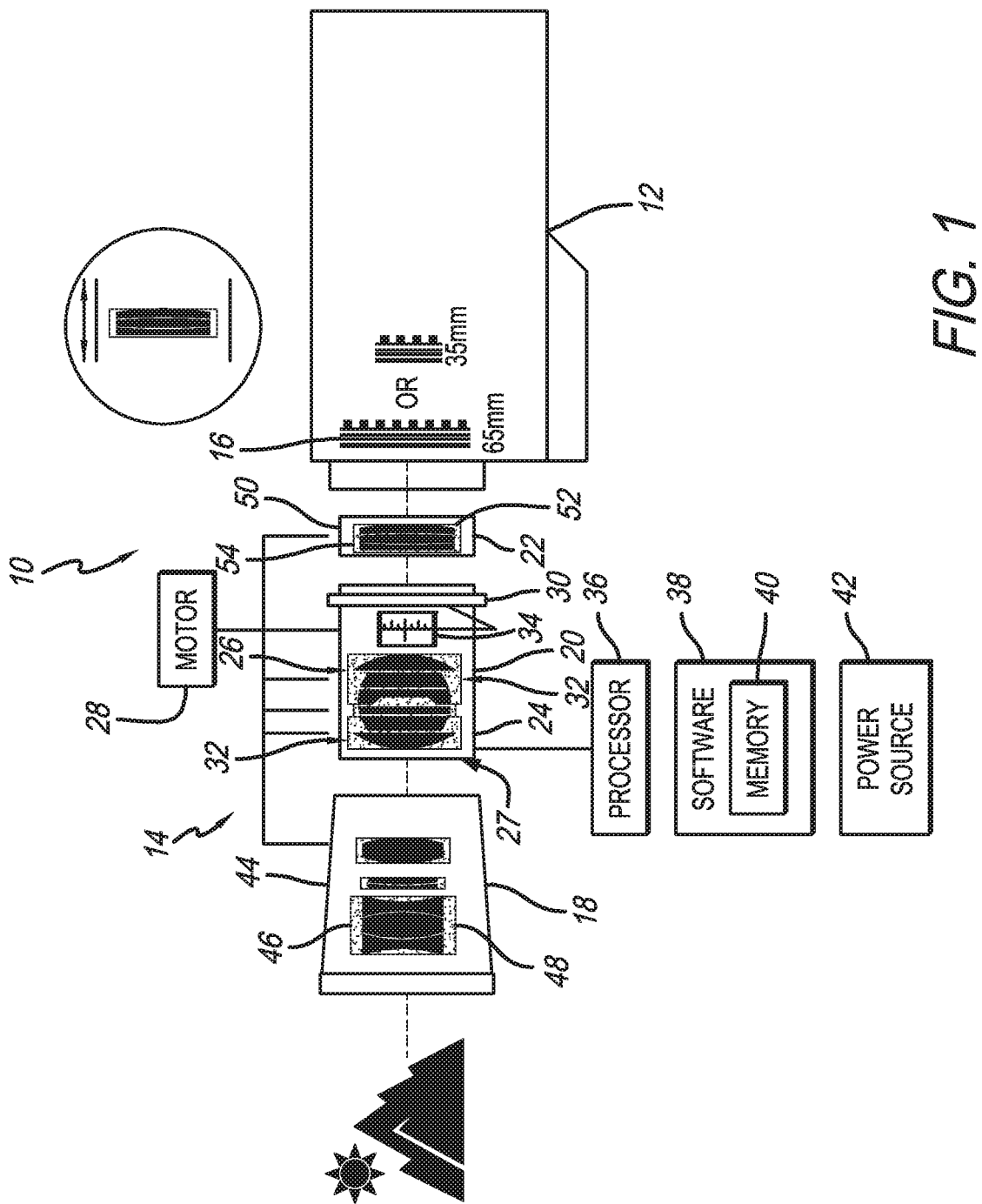
FIG. 1 illustrates a schematic view of a system according to an embodiment of the present disclosure.

FIG. 1 illustrates an embodiment of a camera system 10 including a camera 12 and a lens system 14. The camera 12 may be a digital camera including an image sensor 16. The image sensor 16 may be sized to produce an image equivalent to the size of a 65 mm film image, or in one embodiment may be sized to produce an image equivalent to the size of a 35 mm film image. The image sensor 16 may comprise an imaging area for receiving images from the lens system 14. In one embodiment, the camera 12 may be a film camera including an imaging area for receiving images from the lens system 14 on film.

The lens system 14 may include a front section 18, a central section 20, and a rear section 22. The central section 20 may be configured as a module, or as a self-contained unit that is removable from other components of the camera system 10. The central section 20 may include a housing 24 that may form the exterior of the central section 20, and may retain components of the central section 20. The central section 20 may include one or more lenses 26 configured to vary a focus of an image that is imaged by the central section 20. In one embodiment, the one or more lenses 26 may be configured to vary other optical properties of the image, including a softness of the image, a size of the image, to correct for blur or aberrations in the image, or other optical properties as desired. The one or more lenses 26 may be positioned within the central section 20. The one or more lenses 26 may be spherical or aspherical lenses if desired.

The central section 20 may include an aperture 27 configured to control the amount of light that passes through the central section 20. The aperture 27 may be positioned within the central section 20, and may be positioned arbitrarily with respect to the functionality of the central lens module in line along the optical axis that the one or more lenses 26 are positioned on.

One or more motors 28 may be used to move the one or more lenses 26 of the central section to effect a change in a focus of an image produced by the central section 20. The one or more motors 28 may be positioned exterior to the central section 20, or in one embodiment, any one, or all of the motors 28 may be positioned within the central section 20. The motors may comprise a powered device configured to effect motion in the one or more lenses 26, any may include a linear actuator, a stepper motor, a piezoelectric motor, a solid state motor, or other form of motor for providing powered movement of the one or more lenses 26.

The operation of the one or more motors 28 may be based on a user input. The adjusting user input may be based on a user's operation of a mechanical device such as a rotatable ring 30 or bezel positioned on the exterior of the housing 24.

In other embodiments, other electro-mechanical or opto-mechanical devices such as a switch, slide, position encoder or lever may be used to control the one or more motors 28. In one embodiment, the one or more motors 28 may be controlled based on a signal from a remote device such as a computer, or other electronic device. The central section 20 may include an input for receiving signals from the remote device.

The central section 20 may include rails 32 that the one or more lenses 26 of the central section move along. The one or more lenses 26 may move linearly along the optical axis in response to operation of the one or more motors 28, as noted in the encircled area in FIG. 1. The center section 20 may include a gimbal or other off-axis positioning device to provide other degrees of motion for one or more lenses 26.

The central section 20 may include an indicator 34 that may indicate a property of the central section 20 and/or the one or more lenses 26. The property may be a focus of the one or more lenses 26, a size of the aperture 27, magnification of the image, a measure of softness of an image produced by the one or more lenses 26, combinations thereof, or any other property of the central section 20 and/or one or more lenses 26. In one embodiment, the indicator 34 may be a digital indicator that produces an image or other indicator on a screen or the like. In one embodiment, lens control and state may be indicated by an electronic lens interface.

In one embodiment, the one or more motors 28 may operate to move the one or more lenses 26 of the central section 20 to effect a change in a softness of an image produced by the central section 20. The central section 20 may be configured to produce a gentler roll-off from a point of focus to enhance a softness of the image focus or create a zone of defocus that is not co-planar with the image surface. The softness of the image may be configured to be independent or within the limits of an aperture range. The softness may be controlled by linear or rotational movement of the one or more lenses 26. In one embodiment, the one or more motors 28 may operate to move the one or more lenses 26 of the central section 20 to effect a change in a size of the aperture 27 of the central portion. In one embodiment, other optical features of the central section 20 may be adjusted by the one or more motors 28, including any combination of features discussed herein.

A microcontroller 36 may be utilized to operate any of the functions of the central section 20, including operation of the one or more motors 28. The microcontroller 36 may operate based on software 38 that may be stored in a memory 40. In one embodiment, the software may be integrated into the electrical structure of components of the central section 20. The software may comprise internal firmware for the system. The microcontroller 36 may be configured to process the user input and actuate the motors according to the user input with a control signal. As such, the lens system 14 may operate electronically. In one embodiment, the microcontroller 36 and software 38, and memory 40 may be positioned within the central section 20. A power source 42 may be used to power any functions of the central section 20, including operation of the one or more motors 28. In one embodiment, the power source 42 may comprise a battery. The power source 42 may be positioned external to the central section 20, or may be positioned within the central section 20. In an embodiment in which the power source 42 is external, an electrical conduit may transfer the power to the central section 20.

The central section 20 and its related components beneficially allow a user to perform motorized operation of the optical features of the central section 20. This presents an improvement over prior direct mechanical control of optical features presented in prior lens systems by providing electronic control and actuation of the lenses and aperture. The motorized operation allows for more precise control, and reduces the complexity provided with prior mechanical transport systems. Additional benefits include low power operation, compact lens geometry, temperature stability and closer focus than typically possible with conventional cameras.

The central section 20 beneficially enhances the modular nature of the lens system 14, by being removable from other components of the camera system 10. A user or supplier may easily interchange the central section 20 into different camera systems as desired, based on the modular nature of the central section 20.

The front section 18 may be configured as a module, or as a self-contained unit that is removable from other components of the camera system 10. The front section 18 may include a housing 44 that may form the exterior of the front section 18, and may retain components of the front section 18. The front section 18 may include one or more lenses 46 configured to vary a property of an image that is viewed by the front section 18. One or more motors 28 may be used to move the one or more lenses 46 of the front section to effect a change in its optical properties. In one embodiment, the one or more lenses 46 may comprise a lens group for varying a magnification of an image. In one embodiment, the one or more lenses 46 may comprise an anamorphic lens for varying the magnification of an image in either a horizontal or vertical direction, with the amount of variation in size given by a squeeze ratio, or a ratio of the size of the original image in the powered direction to the size of the resultant image in the powered direction.

The front section may include rails radial or linear 48 that the one or more lenses 46 of the front section may move along. The rails 48 may be configured similarly as the rails 32 discussed in regard to the central portion 20.

The front section 18 may be configured to be removably coupled to the central section 20. Either the front section 18 and/or the central section 20 may include coupler that is configured to couple the front section 18 to the central section 20. In one embodiment, an electrical conduit, which may be integrated in the coupler may be used to transmit a signal to and/or from the microcontroller 36 of the central section 20 such that the microcontroller 36 determines when the front section 18 is coupled to the central section 20. The microcontroller 36 accordingly may be configured to determine a property of the front section 18, including whether or not the front section 18 is present, the make or model of the front section 18, the type of lenses 46 contained within the front section 18, a manner of operation of the lenses 46 of the front section 18, or other properties of the front section 18. In one embodiment, the microcontroller 46 may be configured to determine a property of the front section 18 through alternative means, for example, a particular form of mechanical contact between the front section 18 and central section 20 may indicate a property of the front section 18.

In one embodiment, the one or more lenses 46 of the front section 18, or an optical feature of the front section 18, may be controlled by the one or more motors 28 discussed in regard to the central section 20. In one embodiment, an electrical conduit may transfer control from the microcontroller 36 to the motors 28 within the front section 18 to its one or more lenses 46. As such, a user may provide input to the central section 20 that is used to operate the front section 18. In one embodiment, a separate set of motors 28 may operate the front section 18. The motors may be configured to operate a location or angle of the lenses 46 for example by moving the lenses 46 linearly or rotationally, or may be configured to rotate or otherwise move anamorphic lenses to vary a squeeze ratio of the lenses or compensate for a change in object distance 46. In one embodiment, at least three motors may be positioned in the central section 20 for operating the lenses therein. In one embodiment, at least one motor may be positioned in the front section 18 for operating the lenses therein. In one embodiment, the lens system may utilize at least four motors.

In one embodiment, the motors that operate the front section 18 may be operated by the microcontroller 36 based on electrical signals which may be sent through electrical conduits connecting the front section 20 and central section 20. The microcontroller 36 may be configured to operate the front section 18 based on the property of the front section 18 that is determined by the microcontroller. For example, if the microcontroller 36 determines that the front section 18 comprises a particular type of anamorphic lens, then the microcontroller 36 may utilize software designed to control the particular type of anamorphic lens. The types of components of the system 14 may be preprogrammed as a part of the software. This system beneficially allows varying types of front sections 18 to be utilized with a central section 20, yet the microcontroller 36 remains able to operate both front and central sections. The mechanical complexity of interchanging different types of front sections 18 with central sections 20 may accordingly be reduced. In one embodiment, the microcontroller may be configured to operate the focus and/or aperture and/or other optical features of the central section 20 differently depending on the type of front section 18 utilized. In one embodiment, the front section and rear section may each include registration points for relying information to the microcontroller regarding the type of front or rear section used. The microcontroller may select a matching programmed software used to operate the lens system based on the type of front section and rear section used. The microcontroller may provide unique output signals to the motors of the front section, central section, and rear section based on the programming software.

The rear section 22 may be configured as a module, or as a self-contained unit that is removable from other components of the camera system 10. The rear section 22 may include a housing 50 that may form the exterior of the rear section 22, and may retain components of the rear section 22. The rear section 22 may include one or more lenses 52 configured to vary a property of an image that is viewed by the rear section 22. In one embodiment, the lenses 52 may comprise a scalar that is configured to vary a size of an image for imaging in an imaging area of the camera 12. The scalar may be configured to scale an image to a 35 to 43 mm sensor target, for example in an embodiment in which the other optical components of the lens system are designed to produce a 65 mm format image, and a 35 mm resulting format image is desired. Additionally, the rear section may be formatted as a anamorphic group that integrates both spherical and cylindrical components. The anamorphic group produces a disproportionate magnification from the powered axis and the non-powered axis. This may effectuate an alternative means of creating an anamorphic modular lens of the resulting central and rear modules.

The rear section 22 may include rails 54 that the one or more lenses 52 of the rear section may move along. The rails 54 may be configured similarly as the rails 32 discussed in regard to the central portion 20. The rear section 22 may be coupled to the central section 20 in a similar manner as the front section 18 is described to be coupled to the central section 20. The one or more lenses 52 of the rear section 22 may operate in a similar manner as the lenses 46 of the front section 18. For example, separate motors, or the microcontroller 36 may be used to operate the lenses 46.

The configuration of the lens system 14 may beneficially allow the various sections of the lens system 14 to be interchanged, and controlled electrically, such that mechanical transport structures between the sections are reduced. As such, a user or supplier may enhance the ease in which components are interchanged, to reduce overall inventory of camera systems, and to provide enhanced customization for end users. For example, a particular filter, or plug in filter, used by a film maker may remain in a camera system throughout a day of filming, yet other components of the lens system may be easily interchanged and operable. The film maker may be able to retain the overall look of the film, yet interchange other components used for filming.

Figure 2:
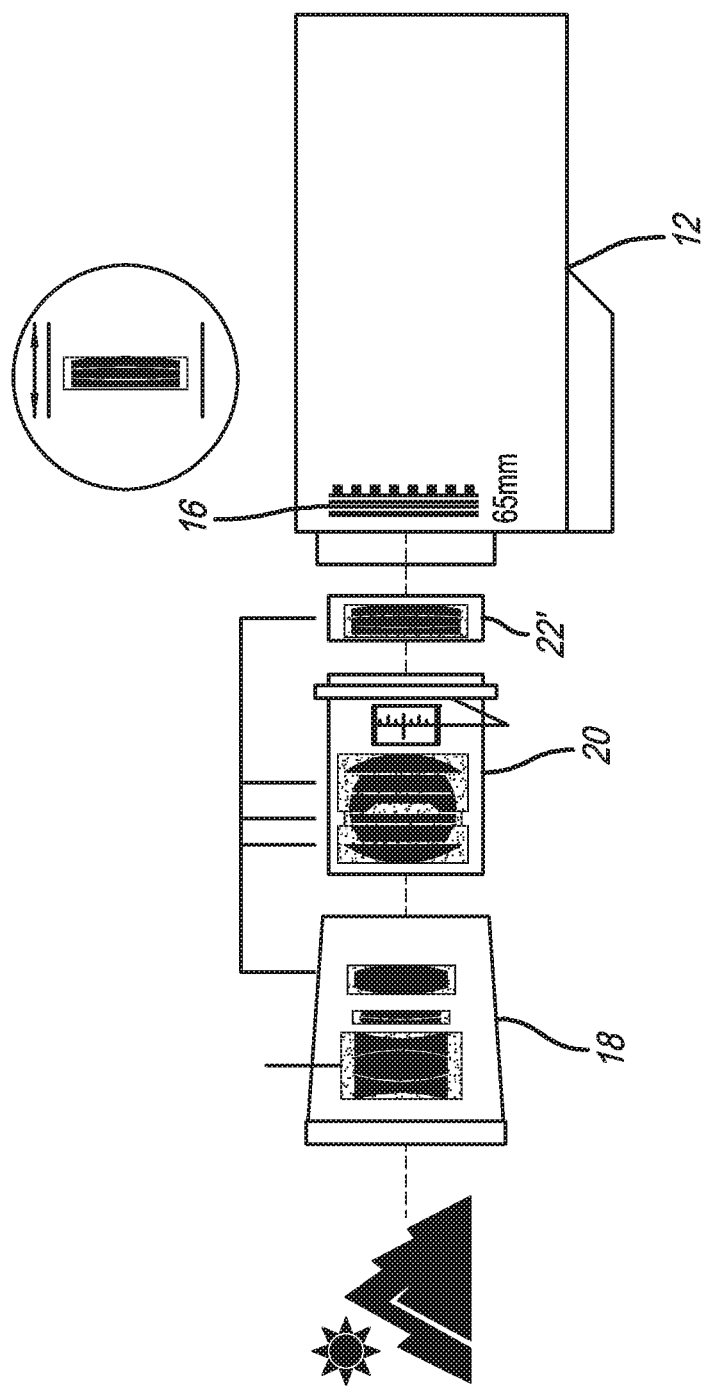
FIG. 2 illustrates a schematic view of a system according to an embodiment of the present disclosure.

The front section 18, central section 20, and rear section 22 may be removed or modified as desired. FIG. 2 illustrates an embodiment of a lens system in which the optical components of the rear section 22' have been excluded. Such a feature may be preferable in an embodiment in which a 65 mm format image sensor 16 is used, and no scaling by the rear section is required. In embodiments of the application, the front section 18 and central section 20 may be configured to produce a large format 65 mm image.

Figure 3:
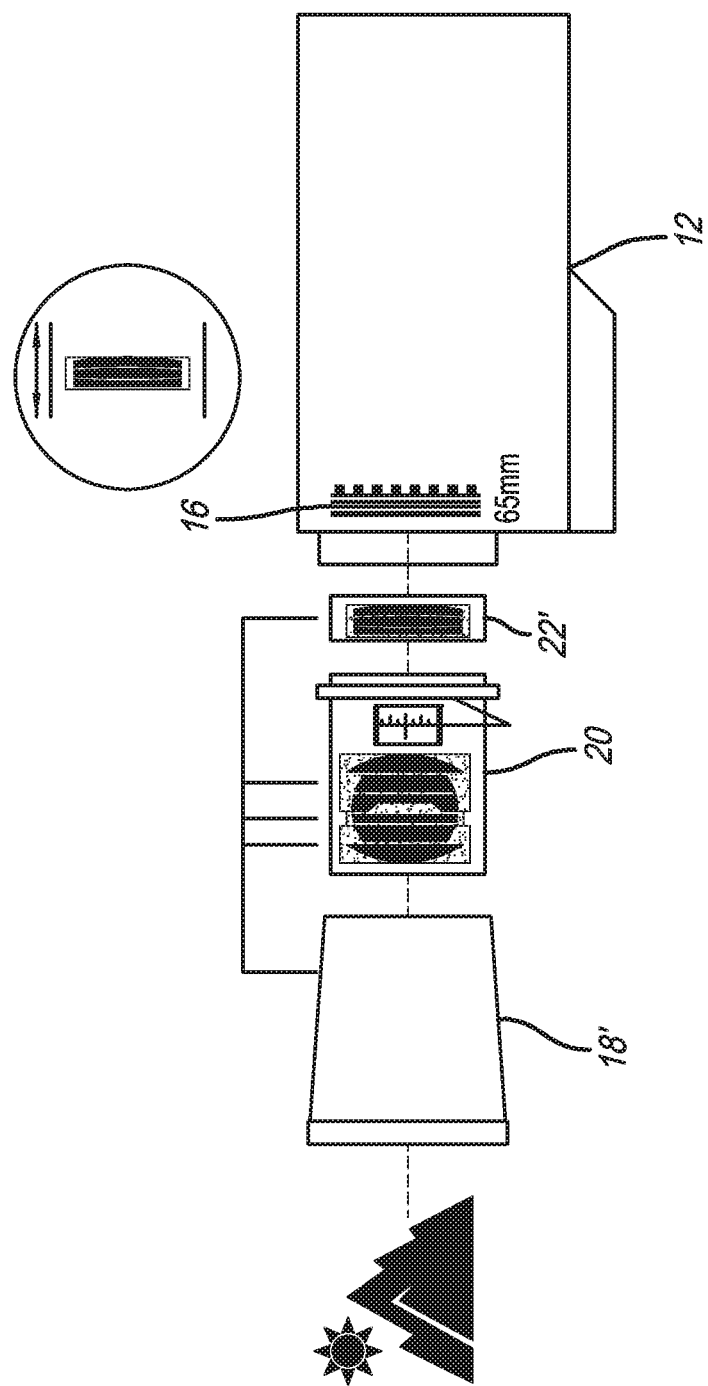
FIG. 3 illustrates a schematic view of a system according to an embodiment of the present disclosure.

FIG. 3 illustrates an embodiment of a lens system in which the optical components of the rear section 22' have been excluded, as well as the optical components of the front section 18'. Such a feature may be preferable in an embodiment in which no anamorphic effect is desired from the front section 18'. The central section 20 may produce an image based on the spherical configuration of the one or more lenses therein.

Figure 4:
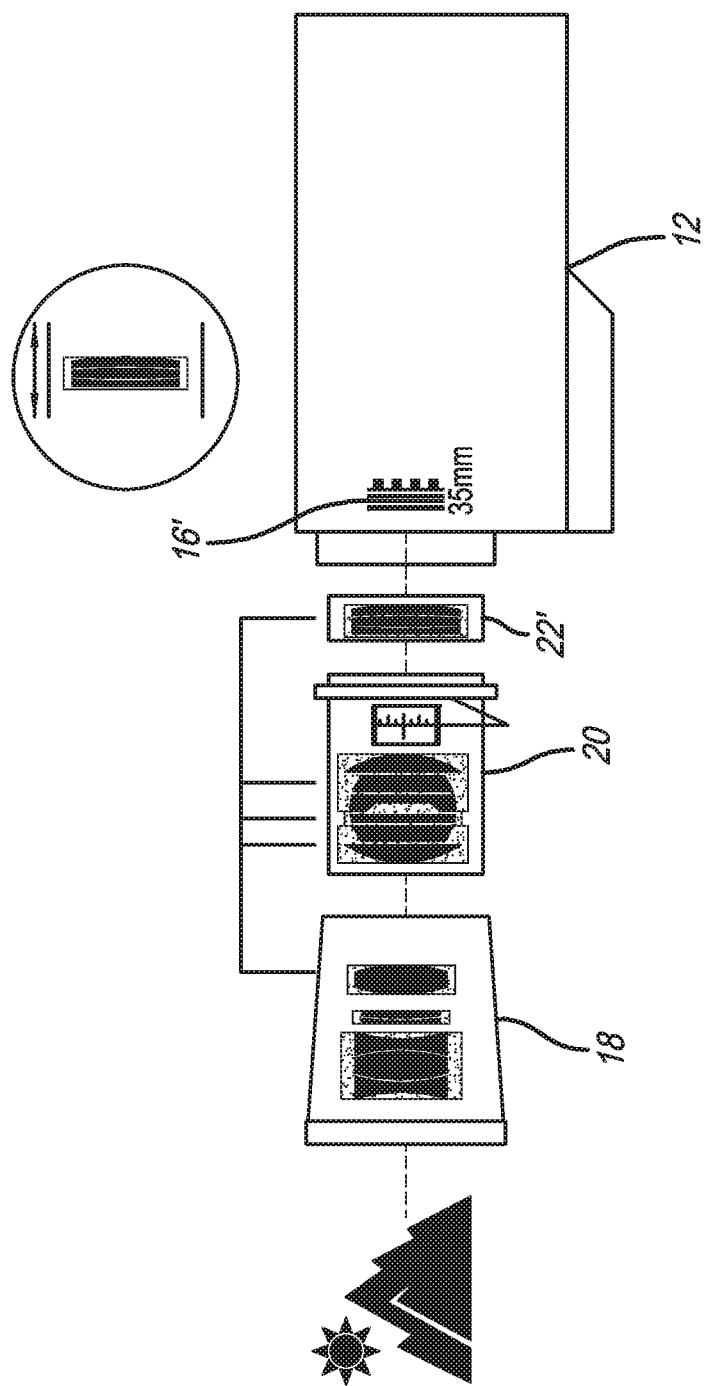
FIG. 4 illustrates a schematic view of a system according to an embodiment of the present disclosure.

FIG. 4 illustrates an embodiment of a lens system in which a 35 mm image sensor 16' is utilized. The optical components of the rear section 22' may scale the image to be appropriate for imaging on the 35 mm sensor. In this embodiment, the optical components of the front section 18 and central section 20 may be configured to produce an image scaled for imaging on a 65 mm sensor.

Figure 5:
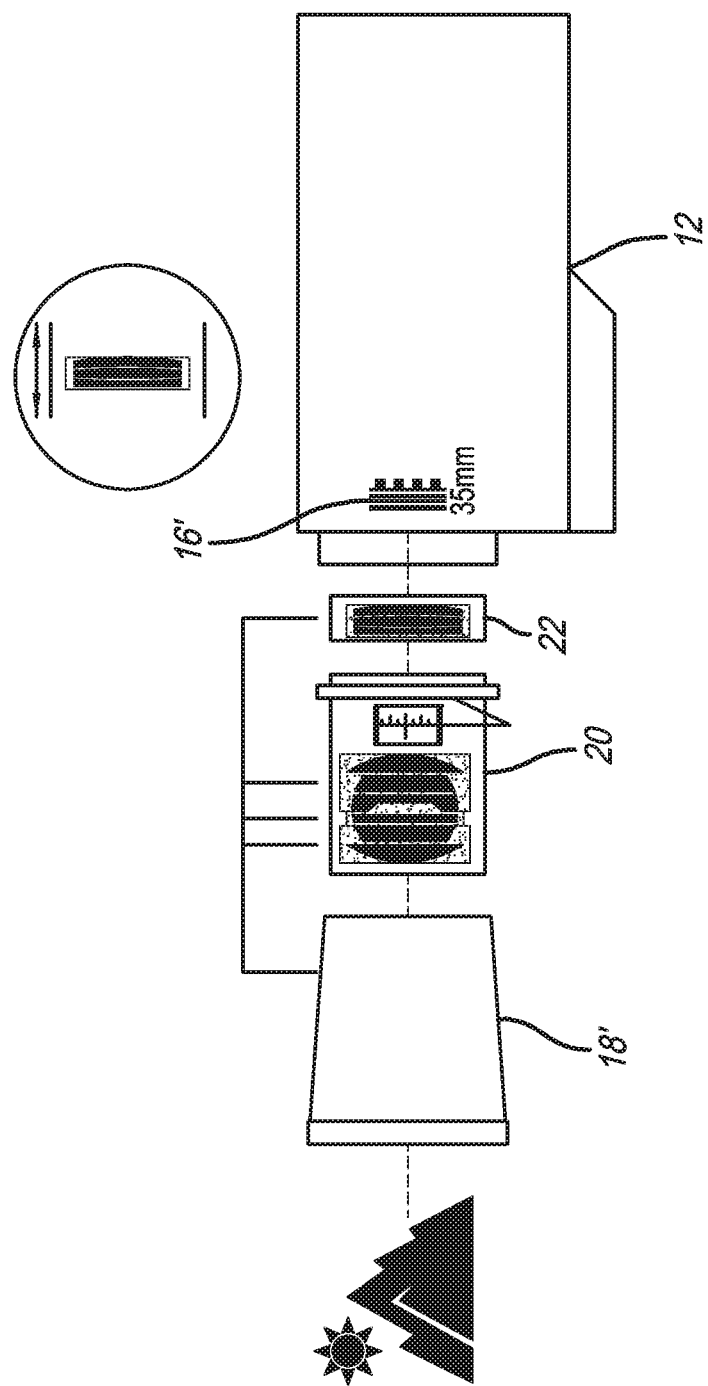
FIG. 5 illustrates a schematic view of a system according to an embodiment of the present disclosure.

FIG. 5 illustrates an embodiment of a lens system in which a 35 mm image sensor 16' is utilized, and the optical components of the front section 18' have been excluded. In this embodiment, no anamorphic effect is desired from the front section 18', and the central section 20 may produce an image based on the spherical configuration of the one or more lenses therein. The rear section 22 may operate as a spherical compressor that operates without an anamorphic image.

Figure 6:
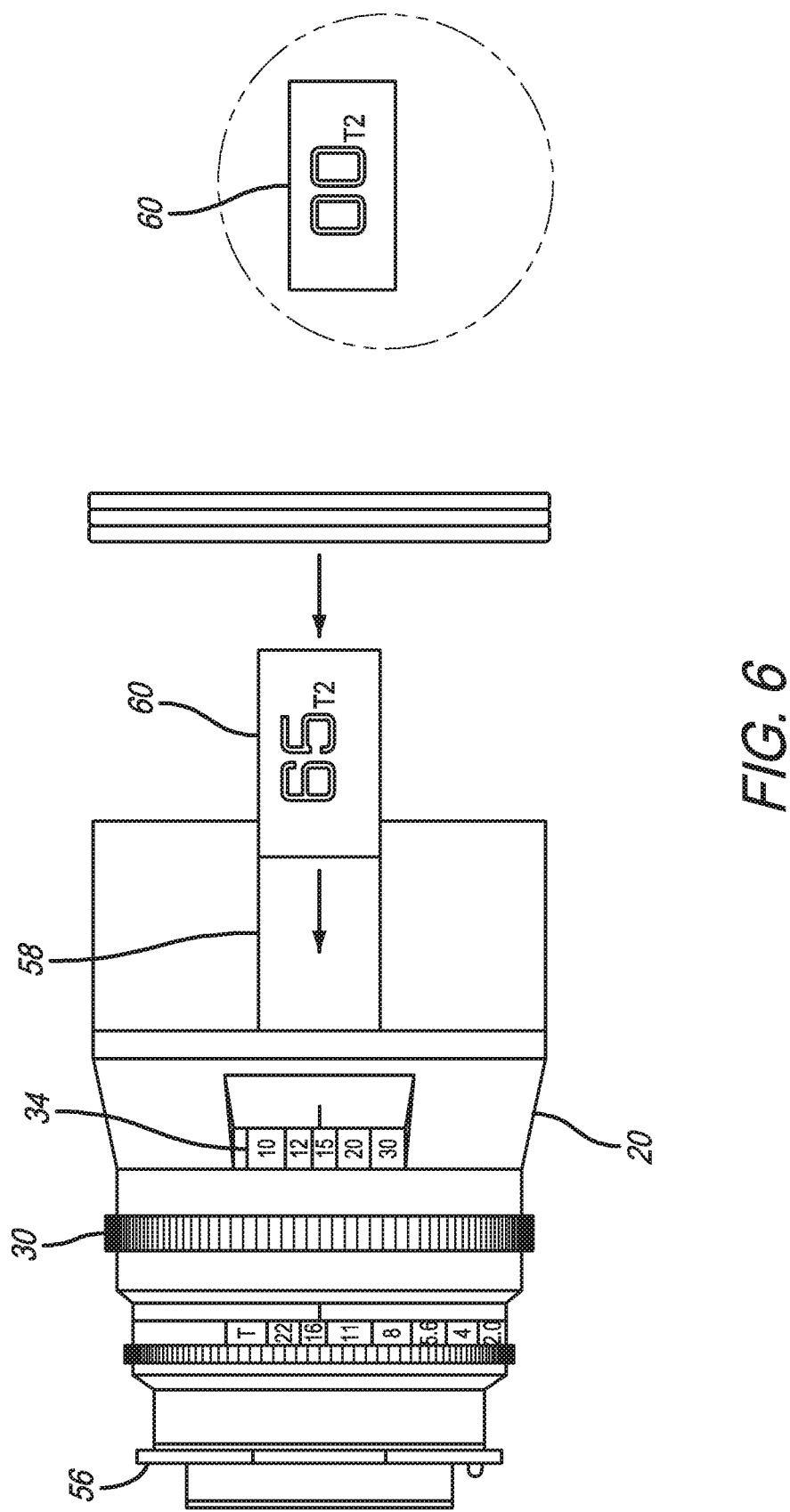
FIG. 6 illustrates a schematic view of a portion of a system according to an embodiment of the present disclosure.

FIG. 6 illustrates an embodiment of a central portion 20 according to an embodiment of the disclosure. A coupler 56 may be positioned at the end of the housing for connection to components of the lens system. The housing of the central portion 20 may include a slot 58 for receiving a tag 60 indicating the type of central portion 20 that is utilized in the lens system.

Figure 7:
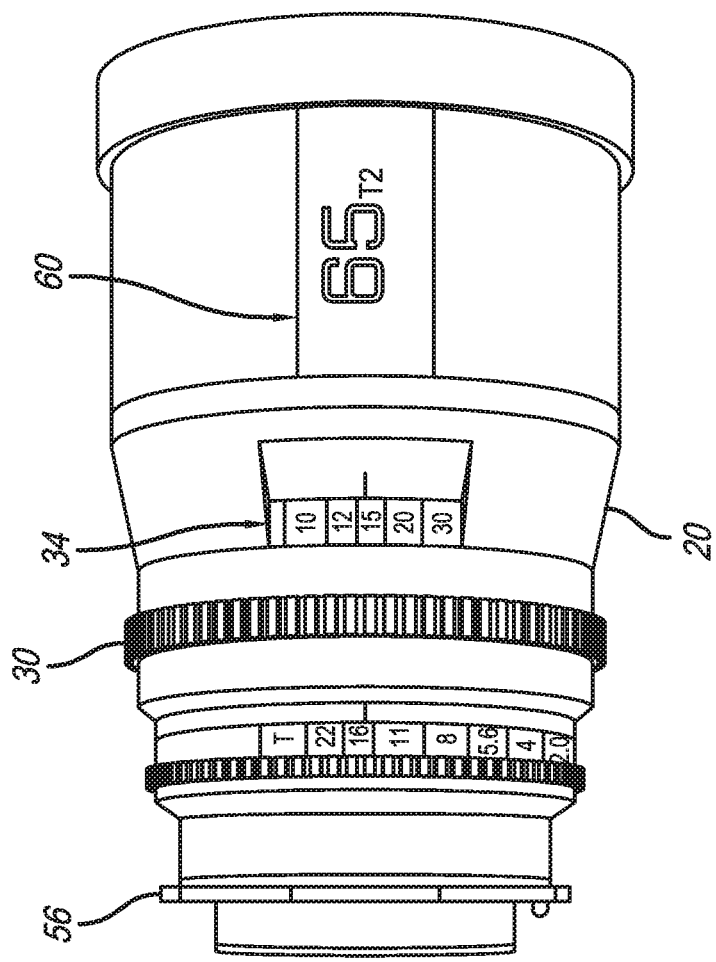
FIG. 7 illustrates a side view of a portion of a system according to an embodiment of the present disclosure.

FIG. 7 illustrates a side view of an embodiment of a central portion 20 according to an embodiment of the disclosure.

The embodiments of lens systems discussed herein may be utilized for various aspect ratios and squeeze ratios. Embodiments include, but are not limited to a 1.29× squeeze ratio converting a 2.20 base aspect ratio to a 2.76 final aspect ratio, a 1.29× squeeze ratio converting a 1.86 base aspect ratio to a 2.40 final aspect ratio, a 1.8× squeeze ratio converting a 1.33 base aspect ratio to a 2.40 final aspect ratio, a 1.8× squeeze ratio converting a 1.5 base aspect ratio to a 2.76 final aspect ratio, a 2× squeeze ratio converting a 1.2 base aspect ratio to a 2.4 final aspect ratio, a 2× squeeze ratio converting a 1.37 base aspect ratio to a 2.75 final aspect ratio, a 1.6× squeeze ratio converting a 1.5 base aspect ratio to a 2.4 final aspect ratio, among others. In one embodiment, a Vista, 65 mm, or 35 mm image sensor, or other digital sensors, or film may be used as desired.

In closing, it is to be understood that although aspects of the present specification are highlighted by referring to specific embodiments, one skilled in the art will readily appreciate that these disclosed embodiments are only illustrative of the principles of the subject matter disclosed herein. Therefore, it should be understood that the disclosed subject matter is in no way limited to a particular methodology, protocol, and/or reagent, etc., described herein. As such, various modifications or changes to or alternative configurations of the disclosed subject matter can be made in accordance with the teachings herein without departing from the spirit of the present specification. Lastly, the terminology used herein is for the purpose of describing particular embodiments only, and is not intended to limit the scope of systems, apparatuses, and methods as disclosed herein, which is defined solely by the claims. Accordingly, the systems, apparatuses, and methods are not limited to that precisely as shown and described.

Certain embodiments of systems, apparatuses, and methods are described herein, including the best mode known to the inventors for carrying out the same. Of course, variations on these described embodiments will become apparent to those of ordinary skill in the art upon reading the foregoing description. The inventor expects skilled artisans to employ such variations as appropriate, and the inventors intend for the systems, apparatuses, and methods to be practiced otherwise than specifically described herein. Accordingly, the systems, apparatuses, and methods include all modifications and equivalents of the subject matter recited in the claims appended hereto as permitted by applicable law. Moreover, any combination of the above-described embodiments in all possible variations thereof is encompassed by the systems, apparatuses, and methods unless otherwise indicated herein or otherwise clearly contradicted by context.

Groupings of alternative embodiments, elements, or steps of the systems, apparatuses, and methods are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Unless otherwise indicated, all numbers expressing a characteristic, item, quantity, parameter, property, term, and so forth used in the present specification and claims are to be understood as being modified in all instances by the term "about." As used herein, the term "about" means that the characteristic, item, quantity, parameter, property, or term so qualified encompasses an approximation that may vary. The terms "approximate[ly]" and "substantial[ly]" represent an amount that may vary from the stated amount, yet is capable of performing the desired operation or process discussed herein.

The terms "a," "an," "the" and similar referents used in the context of describing the systems, apparatuses, and methods (especially in the context of the following claims) are to be construed to cover both the singular and the plural, unless otherwise indicated herein or clearly contradicted by context. All methods described herein can be performed in any suitable order unless otherwise indicated herein or otherwise clearly contradicted by context. The use of any and all examples, or exemplary language (e.g., "such as") provided herein is intended merely to better illuminate the systems, apparatuses, and methods and does not pose a limitation on the scope of the systems, apparatuses, and methods otherwise claimed. No language in the present specification should be construed as indicating any non-claimed element essential to the practice of the systems, apparatuses, and methods.

All patents, patent publications, and other publications referenced and identified in the present specification are individually and expressly incorporated herein by reference in their entirety for the purpose of describing and disclosing, for example, the compositions and methodologies described in such publications that might be used in connection with the systems, apparatuses, and methods. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on the information available to the applicants and does not constitute any admission as to the correctness of the dates or contents of these documents.

What is claimed is:

1. A modular lens system for use with a camera comprising:
    a front section including one or more lenses;
    a central section configured to be coupled to the front section and including one or more lenses, the central section comprising a microcontroller and a user input element operatively connected with the microcontroller; and
    one or more motors configured to move the one or more lenses of the front or central section to effect a change in an optical property;
    wherein the one or more motors are configured to move the one or more lenses of the front or central sections based on a control signal provided by the microcontroller in response to the microcontroller receiving an input signal from to the user input element, and wherein the microcontroller is configured to not receive any control signal from a camera that the modular lens system may be connected with to operate the modular lens system independent of the camera.

2. The modular lens system as recited in claim 1, wherein the front section or the central section includes an aperture.

3. The modular lens system as recited in claim 1, wherein at least one of the one or more motors is disposed in the center section.

4. The modular lens system as recited in claim 1, wherein the central section is configured to be used with different front sections.

5. The modular lens system as recited in claim 4, further comprising a memory that is operatively connected with the microcontroller.

6. A modular lens system for use with a camera comprising:
- a front lens section and a central lens section that each comprise one or more lenses, wherein the front lens section is removably coupled to the central lens section; and
- one or more motors configured to move the one or more lenses to effect a change in an optical feature;
- a single microcontroller disposed in one of the first lens section or second lens section and that is configured to provide a control signal to the one or more motors based on a signal received from a user input element of the modular lens system, and wherein the microcontroller is configured to not receive any control signal from any camera that the modular lens system is used with to operate the modular lens system independent of a camera that the modular lens is attached with.

7. The modular lens system as recited in claim 6, wherein the one or more motors are disposed in the central lens section.

8. The modular lens system as recited in claim 6, wherein the microcontroller is disposed within the central lens section, and wherein the central lens section comprises a power source.

9. The modular lens system as recited in claim 6, comprising an aperture disposed within the central lens section, wherein the aperture is operatively connected with the one or more motors controlled by the microcontroller.

10. The modular lens system as recited in claim 6, wherein the front lens section comprises one of the one or more motors.

11. The modular lens system as recited in claim 6, comprising a rear section configured to couple with the central lens section, wherein the rear section is configured to connect with a camera.

12. The modular lens system as recited in claim 6, wherein the central lens section comprises one of the one or more motors that is operatively connected to move one of the one or more lenses in the first lens section.

13. The modular lens system as recited in claim 6, wherein the central lens section comprises a memory operatively coupled to the microprocessor, wherein the microprocessor is disposed in the central lens section, and wherein the memory is programmed to recognize different first lens sections.

14. A method for making changes in an optical feature of a modular lens system that is configured for use with a camera, the method comprising:
- providing a user input to an input element of the modular lens system that is connected with a microcontroller in the modular lens system, wherein the modular lens system comprises a front lens section configured to be coupled to a center lens section, wherein the input element and the microcontroller are included in the center lens section, and wherein the front lens section and the center lens section each comprise one or more lenses; and
- changing an optical feature in the modular lens system by operation of a motor of the first lens section or the central lens section that is operatively connected with one of the one or more lenses, wherein motor operation is provided in response to a control signal produced by the microcontroller in response to receiving a input signal from the input element, wherein the modular lens system and microcontroller are not connected to receive any control signal from a camera that the modular lens system is connected with so that the microcontroller controls the modular lens system completely independent of a camera.

15. The method as recited in claim 14, wherein the modular lens system comprises a memory that is programmed to enable interchangeable use of the modular lens system with different cameras.

16. The method as recited in claim 14, wherein during the step of providing, the user input comprises physically contacting the input element.

17. The method as recited in claim 14, wherein during the step of providing, the user input comprises using a remote device such that the user does not directly contact the input element.

* * * * *